(12) United States Patent
Rodniansky

(10) Patent No.: US 11,223,650 B2
(45) Date of Patent: Jan. 11, 2022

(54) SECURITY SYSTEM WITH ADAPTIVE PARSING

(71) Applicant: International Business Machines Corporation, Armonk, NY (US)

(72) Inventor: Leonid Rodniansky, Allston, MA (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 16/412,850

(22) Filed: May 15, 2019

(65) Prior Publication Data

US 2020/0366709 A1 Nov. 19, 2020

(51) Int. Cl.
*H04L 29/06* (2006.01)
*G06F 40/211* (2020.01)

(52) U.S. Cl.
CPC ........ *H04L 63/1466* (2013.01); *G06F 40/211* (2020.01); *H04L 63/1416* (2013.01); *H04L 63/20* (2013.01)

(58) Field of Classification Search
CPC . H04L 63/1466; H04L 63/20; H04L 63/1416; G06F 40/211
USPC .......................................................... 726/23
See application file for complete search history.

(56) References Cited

U.S. PATENT DOCUMENTS

| | | | | |
|---|---|---|---|---|
| 5,386,556 | A * | 1/1995 | Hedin | G06F 40/58 |
| 6,009,422 | A | 12/1999 | Ciccarelli | |
| 8,694,448 | B2 * | 4/2014 | Mandelbaum | H04L 41/082 |
| | | | | 706/14 |
| 8,930,380 | B1 * | 1/2015 | Saurabh | G06F 16/285 |
| | | | | 707/755 |
| 9,185,125 | B2 * | 11/2015 | Varsanyi | G06F 21/552 |
| 10,397,272 | B1 * | 8/2019 | Bruss | G06N 20/00 |
| 10,581,879 | B1 * | 3/2020 | Paithane | G06F 21/566 |

(Continued)

FOREIGN PATENT DOCUMENTS

JP 2007-172517 A 7/2007

OTHER PUBLICATIONS

Braband et al, "The melafront system: extensible parsing and transformation," Electronic Notes in Theoretical Computer Science 82 No. 3 (2003).

*Primary Examiner* — Badri Narayanan Champakesan
(74) *Attorney, Agent, or Firm* — Jeffrey S. LaBaw; David H. Judson

(57) ABSTRACT

A security system protecting a monitored system (e.g., a database server) is configured to self-update (extend) a statement/command parser grammar, dynamically. To accomplish this, the security system uses the monitored system itself as a syntax validator (on the parser's behalf), and without requiring any changes or modifications to the monitored server. In one embodiment, the security system comprises a protocol analyzer and the parser. The protocol analyzer extracts a statement/command from a received request and passes it to the parser. If no parser syntax error is found, the statement/command is validated against a security policy. If a parser syntax error occurs, however, the system examines a response from the monitored system to determine whether the parser syntax error is a "false positive." If so, the parser then self-extends its own grammar automatically to correct for the parser syntax error. Once its grammar is updated, the parser is then able to process the original request.

20 Claims, 5 Drawing Sheets

(56) References Cited

U.S. PATENT DOCUMENTS

| | | | |
|---|---|---|---|
| 10,965,696 B1* | 3/2021 | Amram | H04L 63/1433 |
| 2005/0015676 A1* | 1/2005 | Zatloukal | G06F 11/0706 |
| | | | 714/38.1 |
| 2010/0211938 A1* | 8/2010 | Singh | G06Q 20/40 |
| | | | 717/141 |
| 2010/0218253 A1* | 8/2010 | Sutton | G06F 21/554 |
| | | | 726/23 |
| 2012/0303808 A1* | 11/2012 | Xie | H04L 63/101 |
| | | | 709/225 |
| 2014/0278341 A1* | 9/2014 | Ranjan | G06F 40/51 |
| | | | 704/2 |
| 2015/0186355 A1* | 7/2015 | Baldwin | G06F 40/232 |
| | | | 704/9 |
| 2015/0242531 A1* | 8/2015 | Rodniansky | G06F 21/6218 |
| | | | 707/782 |
| 2015/0269383 A1* | 9/2015 | Lang | H04L 63/20 |
| | | | 726/1 |
| 2016/0191554 A1* | 6/2016 | Kaminsky | G06F 21/31 |
| | | | 726/23 |
| 2018/0060569 A1* | 3/2018 | Kim | G06F 21/566 |
| 2018/0084007 A1* | 3/2018 | Dinerstein | G06F 21/6227 |
| 2019/0074013 A1* | 3/2019 | Lawrence | G06F 3/167 |
| 2020/0104356 A1* | 4/2020 | Hewitt | G06F 40/237 |
| 2020/0162484 A1* | 5/2020 | Solis Agea | G06F 21/53 |

* cited by examiner

SECURITY SYSTEM WITH ADAPTIVE PARSING

BACKGROUND OF THE INVENTION

Technical Field

This disclosure relates generally to securing resources in a distributed computing environment.

Background of the Related Art

Protecting various types of servers using intrusion detection is well-known. Security systems of this type typically analyze server access attempts by monitoring a network or local access to a protected server for malicious activity or security policy violations. A security system of this type often includes a parser that is configured to parse statements/commands of incoming requests according to a grammar associated with the server being monitored by the system. As syntax changes in the grammar are implemented on the server (e.g., between consecutive server releases), updated or new language syntax constructs (in subsequent client requests) may not be recognized by the security system parser, which typically operates independently of the underlying monitored server system. In this scenario, clients may issue requests to the server system that are not familiar to or otherwise recognized by the security system parser, thereby jeopardizing the high availability of the security system and risking the possibility of a successful monitored server attack.

BRIEF SUMMARY

A security system (e.g., a database access control system) parser is augmented according to this disclosure to provide additional functionality to enable the parser to operate in an "adaptive" manner and, in particular, to self-extend its own grammar. In this manner, in effect the parser "learns" about syntax or other changes in the grammar of the system that it is monitoring. The parser thus "adapts" to the changes in the monitored system grammar dynamically.

According to an embodiment, a security system that is protecting a monitored system (e.g., a database server) is configured to self-update (extend) its statement/command parser grammar, dynamically. The ability of the parser to update its grammar on-the-fly is facilitated by configuring the security system with the ability to leverage the monitored server system itself as a syntax validator (on the parser's behalf), but without requiring any changes or modifications to the monitored server. In this embodiment, the security system comprises a protocol analyzer and a statement/command parser. In operation, the protocol analyzer parses a received request according to one or more protocol rules, and passes extracted statements/commands to the statement/command parser. If no syntax error is identified by the statement/command parser, then the parsed data is examined/validated against one or more security policies. If, however, a statement/command parser syntax error occurs (e.g., because a request with an unknown syntax construct is received), the security system also examines the response to the request that is provided by the monitored server. Based on the response received from the monitored server, the security system protocol analyzer makes a determination whether the system error identified by the parser is or is not a "false positive." The statement/command parser syntax error is determined to be a false positive if the monitored server responds without a (monitored server) syntax error. If, however, the statement/command parser syntax error also is verified by the monitored server providing its own (monitored server) syntax error, then the security system is assured that its original determination (the existence of a syntax error) is correct. In the case where the monitored server responds without a syntax server error, according to this embodiment the statement/command parser then self-extends (i.e. updates) its own grammar to correct for the statement/command parser syntax error that the statement/command parser has identified. Stated another way, the statement/command parser self-extends its grammar upon a determination of a syntax error that is not also recognized (as such) by the monitored server. Once its grammar is updated, the statement/command parser is then able to process the original request.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
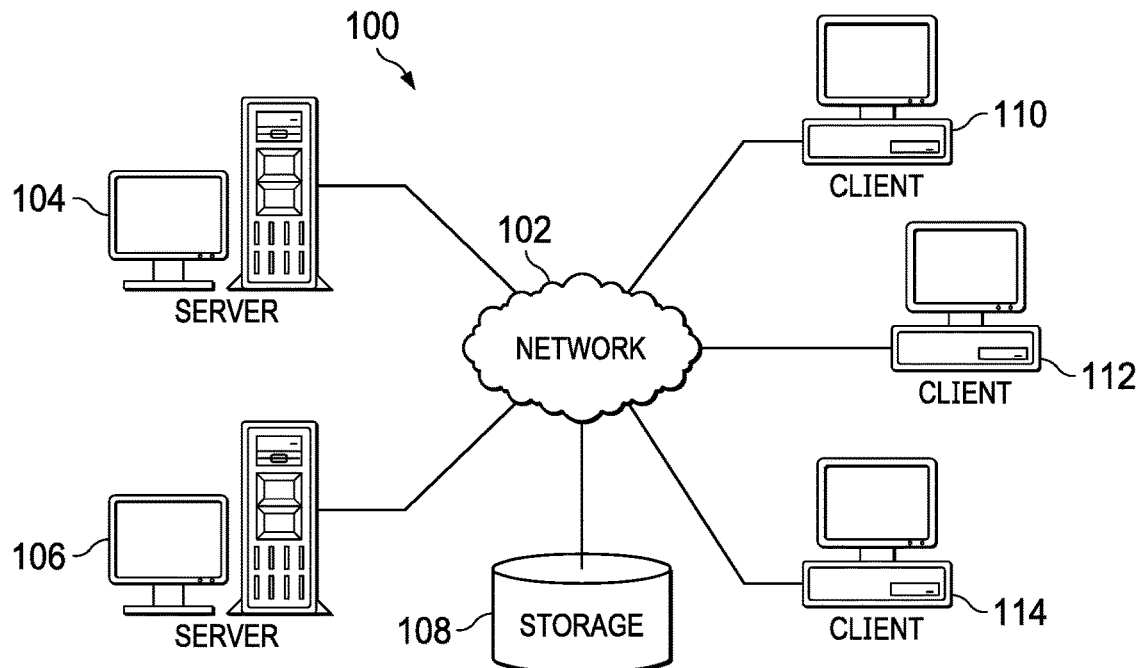
FIG. 1 depicts an exemplary block diagram of a distributed data processing environment in which exemplary aspects of the illustrative embodiments may be implemented.
Figure 2:
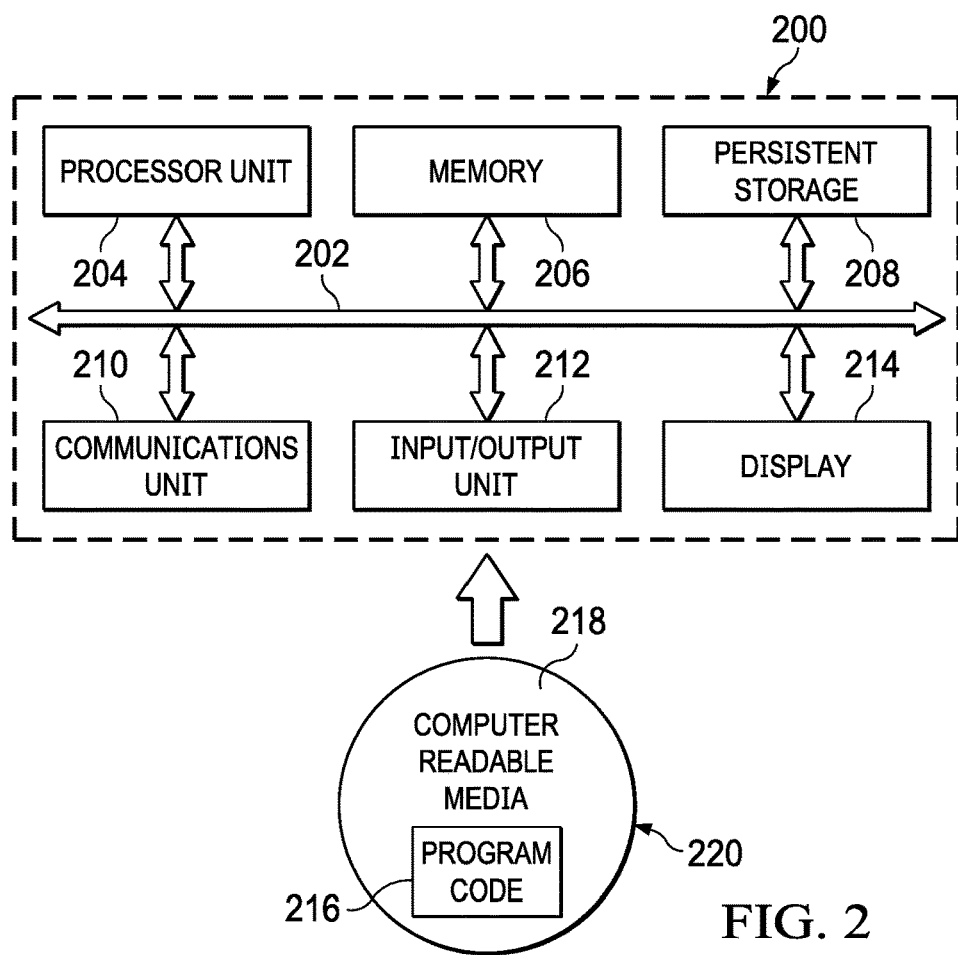
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Monitored Server Security Systems

Figure 3:
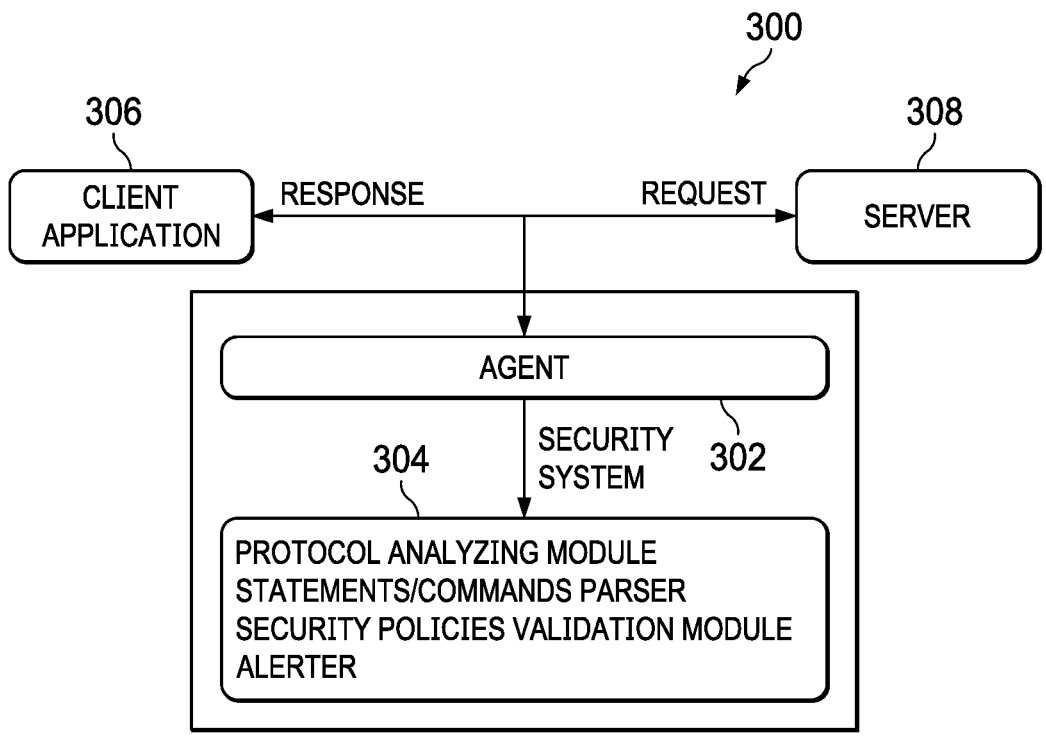
FIG. 3 depicts a generalization of a security system for monitoring a server in a client-server operating environment.

As described above, it is known to protect servers using intrusion detection. Security systems of this type typically analyze server access attempts by monitoring a network or local access to the server. FIG. 3 depicts a general solution of this type. As depicted, in this system 300 a client application 306 interacts with a server 308, and an agent 302 (which may be a proxy, or other monitoring functionality) operates to monitor both requests (to the server) and responses (from the server). The requests and responses are forwarded to a security mechanism 304. The security mechanism 304 typically includes various components, namely, a protocol analyzer module, a statements/commands (or "statement/command") parser, a policy validation module, and an alert module. Generally, the security mechanism is configured to examine the requests and the responses.

In particular, the agent 302 is configured to examine the application protocol request or response. Such a request/response is represented in the form of application protocol structure. Different types of clients/servers use different application protocol and statements/commands languages, although typically the request and response flow is common. Typically, a request contains application protocol metadata. The protocol analyzing module extracts a statement/command from the request. To this end, the protocol analyzing module needs to be aware of the applicable application protocol structures. Statements/commands extracted by the protocol analyzing module are then passed to the statement/command parser for evaluation. The statement/command parser may successfully parse the statement/command extracted by the protocol analyzing module, in which case the statement is then evaluated against one or more security policies. As also previously described, in certain situations, however, the statement/command parser cannot successfully parse the statement/command extracted by the protocol analyzing module. This operating scenario is addressed by the technique of this disclosure, as will be described below.

Figure 4:
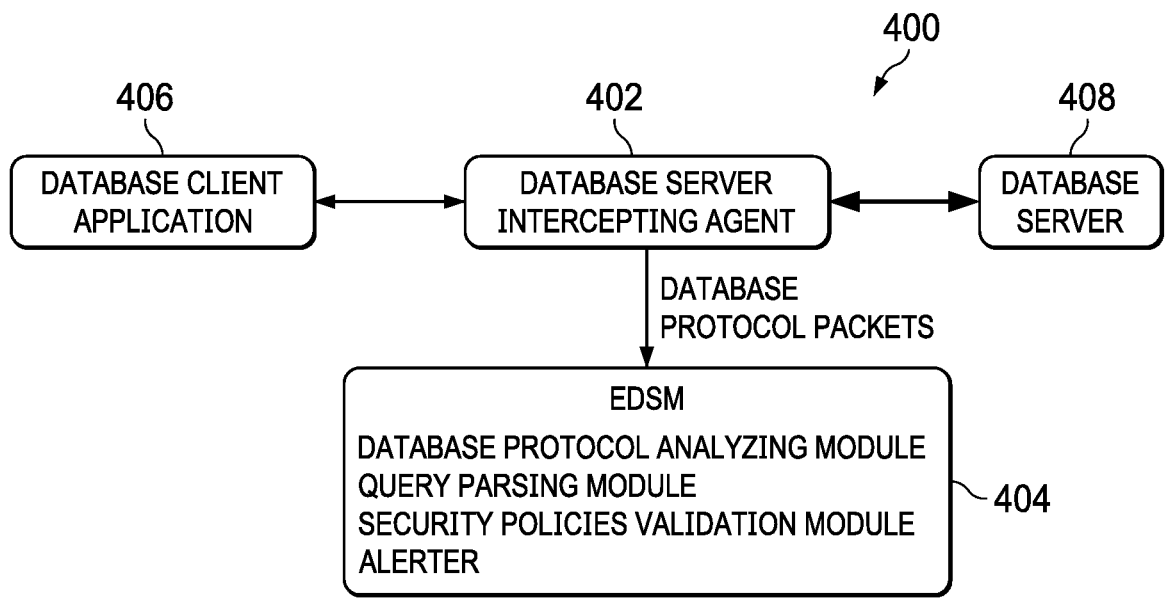
FIG. 4 depicts an access control system (e.g., for a database) that is structured with a 0security mechanism in accordance with the technique shown in FIG. 3.

By way of additional background, FIG. 4 depicts the basic operation of a database access control system 400 that comprises a database server intercepting agent 402 and an associated database security mechanism, e.g., an external-to-database security mechanism (EDSM) 404. As a skilled person will appreciate, the access control system in FIG. 4 is a special case of the generalized security system architecture depicted in FIG. 3. As depicted in FIG. 4, in this embodiment the agent 402 is situated in-line between a database client application 406, and a database server 408. Queries initiated to the database server 408 by the database client application 406 are intercepted by agent 402, and database protocol packets comprising those queries are forwarded to the EDSM 410 for evaluation. In this embodiment, the intercepting agent 402 typically also monitors the responses received from the database server 408. Typically, a database protocol packet refers to a formatted unit of data used in communication between the database client application and the database server.

As is known, EDSM 410 typically includes several modules, e.g., a database protocol analyzing module, a query parsing module, a security policy validation module, and an alerting module. These modules typically are implemented as software executing in hardware. One core function of the EDSM is to extract the database query that is sent by the database client application 406 to the database server 408 and intercepted by the agent 402, parse this query up to a database object level, validate it (for potential database object access violations) against one of more EDSM security policies. If an access violation is detected, the EDSM issues an alert to this effect, or takes some other notification, mitigation or remediation function.

Figure 5:
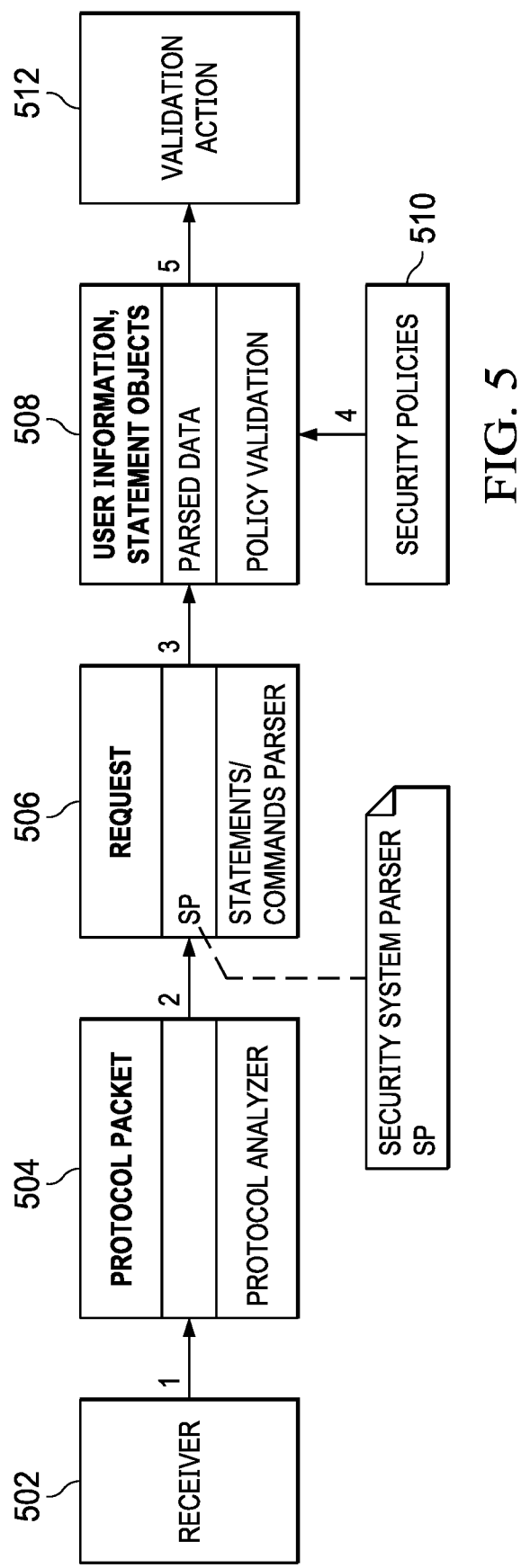
FIG. 5 depicts a security system used to monitor a server system and in which the technique of this disclosure may be implemented.

FIG. 5 depicts the various operation of the modules in a server security mechanism of the type described above. As described, the security mechanism includes various components, namely, a protocol analyzer module, a statement/command parser, a policy validation module, and an alert module. As has also been described, the security mechanism is configured to examine the requests to the server and the responses from the server. FIG. 5 depicts the operation of these modules in additional detail.

As depicted, a receiver 502 receives the query or server response, e.g. from the intercepting agent, or some other query source depending on the implementation. A protocol packet protocol analyzer 504 receives and analyzes the query or server response, as the case may be. The output of the protocol analyzer 504 is supplied to the parser 506, which parses statements/commands in the request or response in accordance with a parser grammar. Typically, the grammar is that which is associated with the system being monitored (e.g., a database server 308, 408). As described above, and with respect to a database request, the parser 506 parses the query up to a database object level, and validates the resulting parsed data 508 against one or more security policies 510. Depending on the result of this analysis, typically some form of validation action 512 is taken.

As described above, when syntax changes in the grammar are implemented on the server (e.g., as may occur between consecutive database releases for a database server), updated or new language syntax constructs (in subsequent client requests) may not be recognized by the statement/command parser 506, which typically operates independently of the underlying database server system. In this scenario, clients may issue database requests to the server system that are not familiar to or otherwise recognized by the parser 506. When such differences arise between the parser grammar and the underlying database system grammar, there is an increased likelihood that the security system will operate inconsistently. This jeopardizes the high availability of the security system and risks the possibility of a database attack being missed.

Security System with Adaptive Parsing

With the above as background, the technique of this disclosure is now described. According to this approach, the security system (e.g., in an EDSM) is configured to self-update (extend) its parser grammar, dynamically. The ability of the parser to update its statement/command grammar on-the-fly is facilitated by configuring the security system with the ability to leverage the monitored server system itself as a syntax validator (on the parser's behalf), but without requiring any changes or modifications to the monitored server. In this approach, the security system (protocol analyzer and statement/command parser) parses a received request. If no syntax error is identified, then the parsed data (e.g., 510) is examined/validated against the one or more security policies as previously described. If, however, a parser syntax error occurs (e.g., because a request with an unknown syntax construct is received by the parser), the security system also examines the response (of the monitored server) to the original request. Depending on implementation, the security system may need to wait for this response, or the response may simply be captured by the agent as it passes from the server back to the client. Based on the response obtained (by interception or otherwise) from the monitored server, the security system makes a determination whether the system error identified by the statement/command parser is or is not a "false positive." The parser syntax error is determined to be a false positive if the monitored server responds without a (monitored server) syntax error. If, however, the parser syntax error also is verified by the monitored server providing its own (monitored server) syntax error, then the security system is assured that its original determination (the existence of a syntax error) is correct. In the case where the monitored server responds without a syntax server error, according to this disclosure the statement/command parser then self-extends (i.e. updates) its own grammar with respect to the parser syntax error that the parser has identified. Stated another way, the parser self-extends its grammar upon a determination of a syntax error that is not also recognized (as such) by the monitored server.

Figure 6:
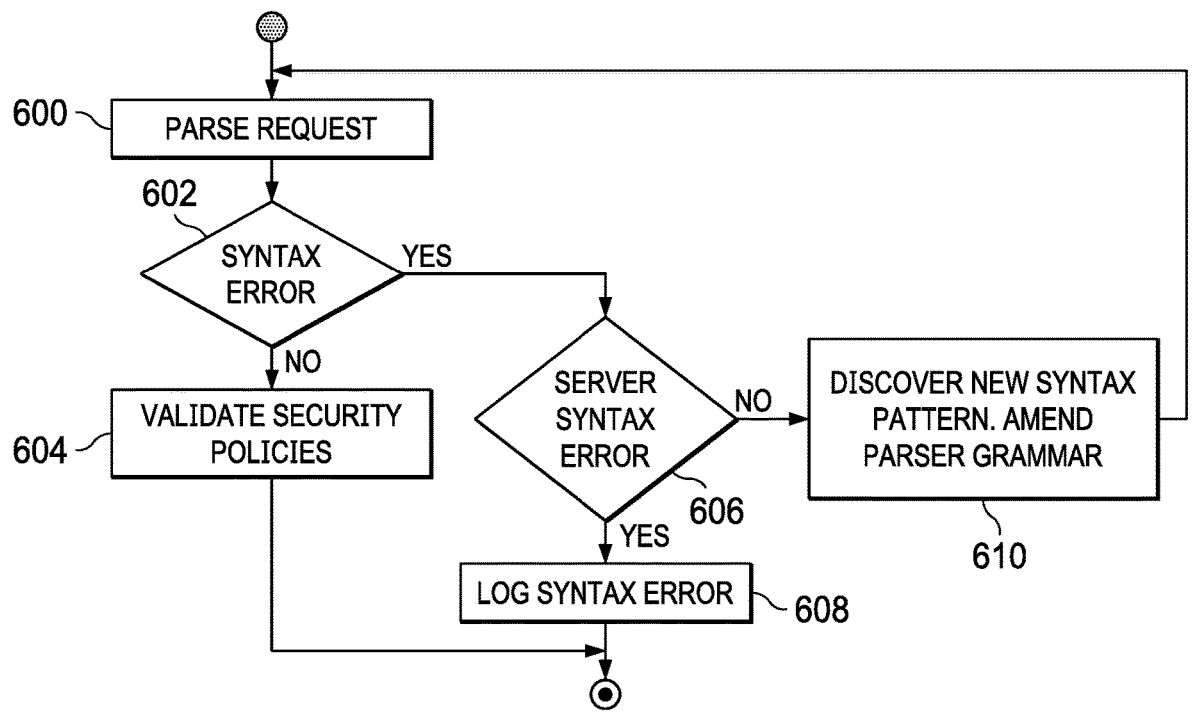
FIG. 6 illustrates a process flow depicting the technique of this disclosure.

FIG. 6 depicts a process flow of a preferred operation of security system that is extended or augmented in the manner described. The process begins at step 600 with the statement/command parser parsing the request, in this embodiment a statement/command forwarded from a protocol analyzer when the security system is a monitoring server system. As noted, the technique of this disclosure may be implemented with any type of security system. At step 602, a test is performed to determine whether the statement/command parser has identified a syntax error. If the outcome of the test is negative, the routine continues at step 604 by validating one or more security policies and then providing an output (not shown). If, however, the outcome of the test at step 602 indicates that the parser has identified a syntax error, the routine branches to step 606. At this step, and after the security system obtains the monitored server response (which the security system may need to wait on, depending in implementation), a test is performed to determine whether the monitored server has identified a syntax error as well. This step is facilitated by the protocol analyzer evaluating the response intercepted (or otherwise obtained) from the monitored server.

If the outcome of the test at step 606 is positive, then syntax error is recognized by both the security system and the monitored server itself, and thus the routine continues at step 608 to log the syntax error. Other actions may be taken as well, e.g., blocking the request, sandboxing the client, pushing a violation alert, etc. If the outcome of the test at 606 is negative, however, then the statement/command parser syntax error is a false positive. In such event, the routine continues at step 610 with the statement/command parser (i) discovering the new or modified syntax pattern (that was the cause of the parser syntax error), and (ii) then amending its own grammar to reflect the new or modified syntax pattern so discovered. Thus, and in this manner, the parser self-extends its own grammar when there is a statement/command parser syntax error but no monitored server syntax error. By the operation, false positive syntax errors identified by the parser are in effect filtered out. A statement/command parser that is configured in this manner is sometimes referred to herein as an adaptive statement/command parser (ASP).

Figure 7:
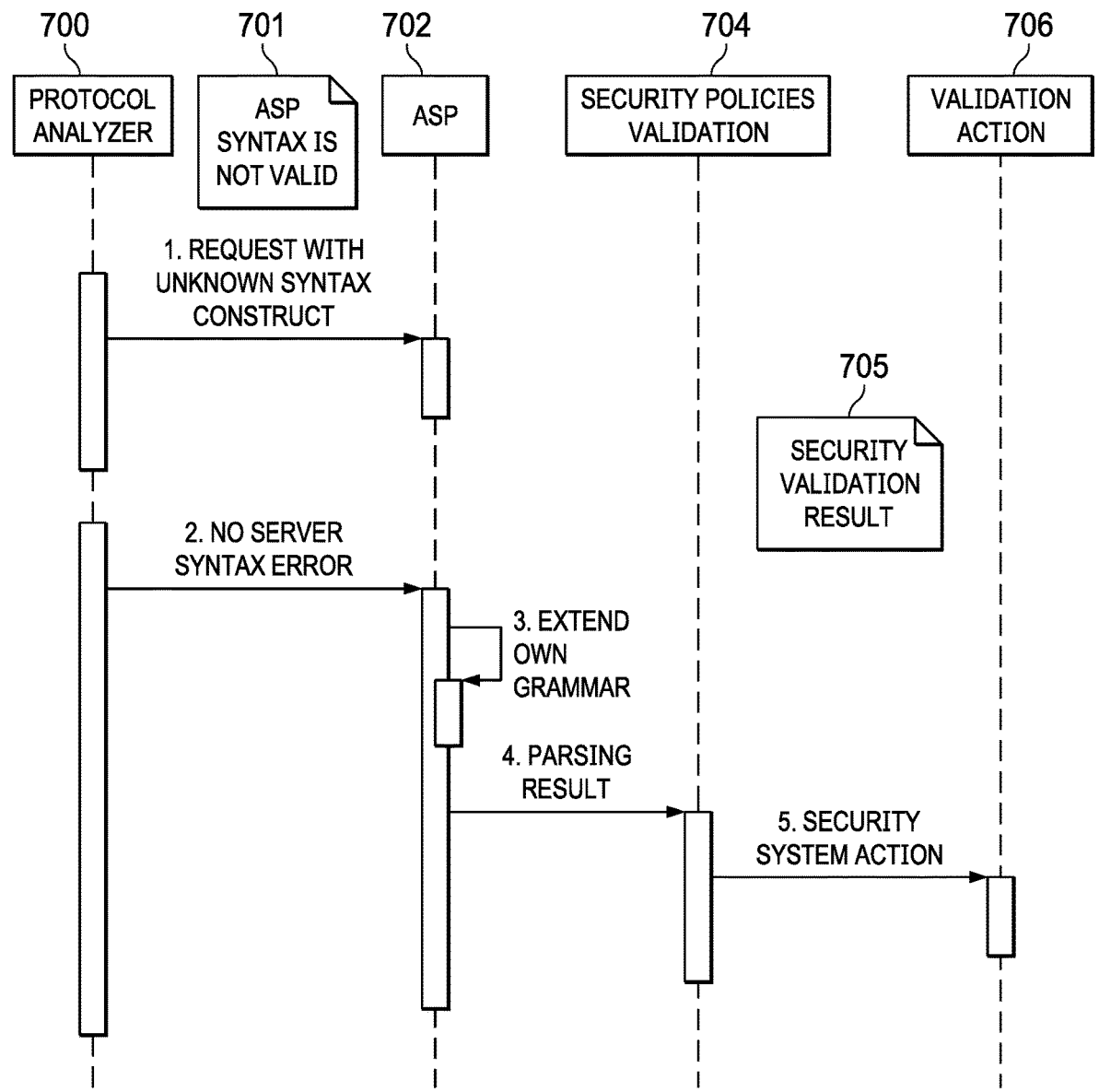
FIG. 7 depicts the overall processing of a client request by a security system that has been augmented according to the technique of this disclosure.

FIG. 7 depicts the overall operation of a security system that is configured with an adaptive statement/command parser of a security system having the above-described functionality. As shown, the security system comprises several components/modules, namely the protocol analyzer 700, the ASP 702, and a security policy validator 704. As depicted at (1), the protocol analyzer extracts a syntax construct from the request. The ASP 702 parses the syntax construct. In this example, the syntax is problematic, and thus a "syntax is not valid" error 701 is generated by ASP 702. Using the technique of this disclosure, the response provided from the monitored server also is analyzed by the protocol analyzer. As depicted at (2), in this example, it is assumed that the monitored server has an updated or modified language grammar and that, accordingly, the monitored server recognizes the request for handling. In such case, when the protocol analyzer 700 analyzes the monitored server response, the protocol analyzer does not identify any (monitored) server syntax error. The "no server syntax error" is forwarded to the ASP 702. Because the response from the monitored server does not include any syntax error, but also because the ASP already has a "syntax is not valid" error for the same request, the ASP 702 knows that it has to extend its own grammar. Thus, and at (3), APS 702 amends its grammar in an automated manner. Once this amendment, update or modification (as the case may be), the ASP now has the capability to parse the request (the one that generated the "syntax is not valid" error at step (1). At (4), the parsed request result is then sent to the security policy validation component/module 704 for evaluation. At (5), and based on applying the one or more security policies, the validator 704 outputs a security validation result 705 and provides for the security system action by the appropriate system, device or process 706 (e.g., alerting, logging, remediation, etc.).

The nature of the particular grammar update depends on the internal configuration of the statement/command parser and is not a limitation of the technique. An example of an update is adding a new syntax keyword to an existing token set.

The technique provides significant advantages. The approach herein enables a security system command/statement parser to extend its grammar dynamically, all while continuing to operate in-line (or out-of-band) as client requests are received and processed by the security system. Thus, the security system remains functional in the event of requests with unknown syntax. By leveraging the monitored server responses, the security system parser's false positives are effectively filtered out and do not impact security system operations. The security system remains highly available and reliable, even as updates to the monitored server system are occurring in real-time. The approach is carried out without requiring changes to the monitored system, thereby providing easy configuration and management. The technique herein thus enables the access control system to continue robust and timely operation when the syntax of an incoming request is allowed by the database server but unknown by the security parser.

As previously noted, the technique is not limited for use in a database access control system having an intercepting agent and the EDSM (FIG. 4), although this is a representative system that benefits from the approach. Indeed, the technique herein is not limited to the monitored server system being a database, as the approach herein may be leveraged with respect to any security system (e.g., see FIG. 3 for the general case) that includes a parser (e.g., a statement/command parser) configured to parse requests directed to a backend monitored system, and where request syntax across the systems becomes unsynchronized for any reason. In a typical scenario, this lack of synchronization occurs when the monitored (backend) system server has a version update but the security system vendor is unaware of the update or does not create a patch for the version update in a timely manner.

In practice, servers (such as the database server) have large numbers of different clients working simultaneously. The technique of this disclosure works irrespective of the reasons for the discrepancy between the security system, on the one hand, and the monitored system, on the other hand. In one example scenario, an old server release is running on the backend server and the request has a new syntax attribute (e.g., "IS JSON"), such as "SELECT RECORDS FROM CREDIT_CARDS WHERE RECORDS IS JSON". This request would cause a server syntax error. A server syntax error may also occur where the new server release is running but the request is malformed, e.g., such as "SELECT RECORDS FOM CREDIT_CARDS WHERE RECORDS IS JSON." In neither of these two cases does the security system self-extend its grammar because the server responds to the client request with a syntax error. However, and continuing with this example scenario, where the new server release is running, the request is properly formed, and the new request syntax causes a statement/command parser error (e.g., due to inclusion of "IS JSON"), the statement/command parser self-extends its own grammar in the manner described. An example request that would trigger this operation is the query "SELECT RECORDS FROM CREDIT_CARDS WHERE RECORDS IS JSON." This is the same query used in the first example, but the difference in handling occurs as a result of the difference releases (old versus new) running on the monitored server, as in the former case the server response is analyzed to find a server syntax error, but there is no server syntax error that arises with the updated release version.

Generalizing, the enhanced security system functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

In a representative embodiment, the agent and EDSM components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the EDSM described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As already mentioned, the techniques disclosed herein are not limited to a multi-component transaction processing environment, but this will be a typical implementation. As noted, the above-described function may be used in any system, device, portal, site, or the like wherein request query syntax may be changed, modified, updated or otherwise altered.

Further, the technique described herein is not limited for use with any particular application protocol, and it may be applied in other application schemes generally. Thus, while the depicted approach is a preferred operating environment, the approach may be implemented in any application scheme wherein application client requests are processed for potential security violations in the manner described.

The techniques herein provide for improvements to another technology or technical field, namely, security systems, as well as improvements to the operational capabilities of such systems when used in the manner described.

Having described the invention, what is claimed is as follows:

1. A method operative in a security system wherein client requests directed to a monitored system are examined for validation against a security policy, the security system including a parser, comprising:
   receiving and analyzing a client request;
   upon detecting that the client request has a syntax error, evaluating a response to the client request from the monitored system; and
   determining whether the response has an associated syntax error;
   based on a determination that the response does not have the associated syntax error, the parser self-extending its grammar by discovering a syntax pattern that caused the syntax error and automatically updating the grammar to reflect the discovered syntax pattern; and
   filtering the syntax error;
   wherein the parser extends its grammar dynamically while continuing to operate as client requests are received and processed by the security system.

2. The method as described in claim 1 further including parsing the client request against a security policy after the grammar has been updated.

3. The method as described in claim 1 wherein the syntax error results from an installed version of the monitored system having been updated without patching of the parser.

4. The method as described in claim 1 wherein the security system is a database access control system, and the monitored system is a database server.

5. The method as described in claim 1 further including:
   classifying the syntax error as a false positive.

6. The method as described in claim 1 wherein the syntax error is that the client request includes a syntax construct that is unknown to the parser of the security system.

7. Apparatus configured as a security system that examines client requests directed to a monitored system for validation against a security policy, the security system including a parser, comprising:
   a processor;

computer memory holding computer program instructions executed by the processor, the computer program instructions comprising program code configured to:

receive and analyze a client request;

upon detecting that the client request has a syntax error, evaluate a response to the client request from the monitored system;

determine whether the response has an associated syntax error;

based on a determination that the response does not have the associated syntax error, control the parser to self-extend its grammar by discovering a syntax pattern that caused the syntax error and automatically updating the grammar to reflect the discovered syntax pattern; and filter the syntax error;

wherein the parser extends its grammar dynamically while continuing to operate as client requests are received and processed by the security system.

8. The apparatus as described in claim 7 wherein the computer program code is further configured to parse the client request against a security policy after the grammar has been updated.

9. The apparatus as described in claim 7 wherein the syntax error results from an installed version of the monitored system having been updated without patching of the parser.

10. The apparatus as described in claim 7 wherein the security system is a database access control system, and the monitored system is a database server.

11. The apparatus as described in claim 7 wherein the program code is further configured to:

classify the syntax error as a false positive.

12. The apparatus as described in claim 7 wherein the syntax error is that the client request includes a syntax construct that is unknown to the parser of the security system.

13. A computer program product in a non-transitory computer readable medium, the computer program product holding computer program instructions executed by a processor as a security system that examines client requests directed to a monitored system for validation against a security policy, the security system including a parser, the computer program instructions comprising program code configured to:

receive and analyze a client request;

upon detecting that the client request has a syntax error, evaluate a response to the client request from the monitored system;

determine whether the response has an associated syntax error;

based on a determination that the response does not have the associated syntax error, control the parser to self-extend its grammar by discovering a syntax pattern that caused the syntax error and automatically updating the grammar to reflect the discovered syntax pattern; and filter the syntax error;

wherein the parser extends its grammar dynamically while continuing to operate as client requests are received and processed by the security system.

14. The computer program product as described in claim 13 wherein the computer program code is further configured to parse the client request against a security policy after the grammar has been updated.

15. The computer program product as described in claim 13 wherein the syntax error results from an installed version of the monitored system having been updated without patching of the parser.

16. The computer program product as described in claim 13 wherein the security system is a database access control system, and the monitored system is a database server.

17. The computer program product as described in claim 13 wherein the program code is further configured to:

classify the syntax error as a false positive.

18. The computer program product as described in claim 13 wherein the syntax error is that the client request includes a syntax construct that is unknown to the parser of the security system.

19. A security system operated in association with a monitored system, comprising:

a software-based security mechanism executed in hardware and configured to: (a) receive a query for validation against a security policy; (b) make a determination that the query so received has a syntax error that is not also recognized as such by the monitored server; (c) thereafter, and responsive to the determination, self-extend a parsing grammar used by the security mechanism and filter the syntax error; and (d) apply the self-extended parsing grammar to the query.

20. The security system as described in claim 19 wherein the monitored system is a database, and the security mechanism comprises a protocol analyzer, and a statement/command parser, the parsing grammar being implemented by the statement/command parser.

* * * * *